(12) United States Patent  
Roden

(10) Patent No.: US 6,226,983 B1
(45) Date of Patent: May 8, 2001

(54) FUEL INJECTED HEAT EXCHANGER FOR INTERNAL COMBUSTION ENGINE EXHAUST

(75) Inventor: Michael J. Roden, Prescott, AZ (US)

(73) Assignee: Professional Chemicals Corporation, Chandler, AZ (US)

( * ) Notice: Subject to any disclaimer, the term of this patent is extended or adjusted under 35 U.S.C. 154(b) by 0 days.

(21) Appl. No.: 09/326,324

(22) Filed: Jun. 7, 1999

(51) Int. Cl.[7] .................................................. F01N 3/10
(52) U.S. Cl. ................................. 60/307; 60/320
(58) Field of Search ........................ 60/303, 307, 320, 60/286, 295, 289, 298

(56) References Cited

U.S. PATENT DOCUMENTS

| Re. 25,858 | * | 9/1965 | Matvay | 60/320 |
|---|---|---|---|---|
| 2,200,379 | * | 5/1940 | Williams | 60/320 |
| 3,709,473 | * | 1/1973 | Ito et al. | 437/326 |
| 5,184,464 | * | 2/1993 | Harris | 60/320 |
| 5,934,073 | * | 8/1999 | Gieshoff et al. | 60/320 |

FOREIGN PATENT DOCUMENTS

| 2904700 | * | 2/1979 | (DE) | 60/320 |
|---|---|---|---|---|
| 54-087945 | * | 7/1979 | (JP) | |
| 359045216 | * | 9/1982 | (JP) | |
| 0190513 | * | 11/1983 | (JP) | 60/320 |
| 360202205 | * | 10/1985 | (JP) | |
| 403210009 | * | 9/1991 | (JP) | |

* cited by examiner

Primary Examiner—Thomas Denion
Assistant Examiner—Diem Tran
(74) Attorney, Agent, or Firm—Cahill, Sutton & Thomas P.L.C.

(57) ABSTRACT

A heat exchanger for heating cleaning liquid with exhaust gasses from an internal combustion engine that have been treated by a catalytic converter further includes an arrangement for injecting fuel into the gases to further provide heat in the exchanger.

2 Claims, 3 Drawing Sheets

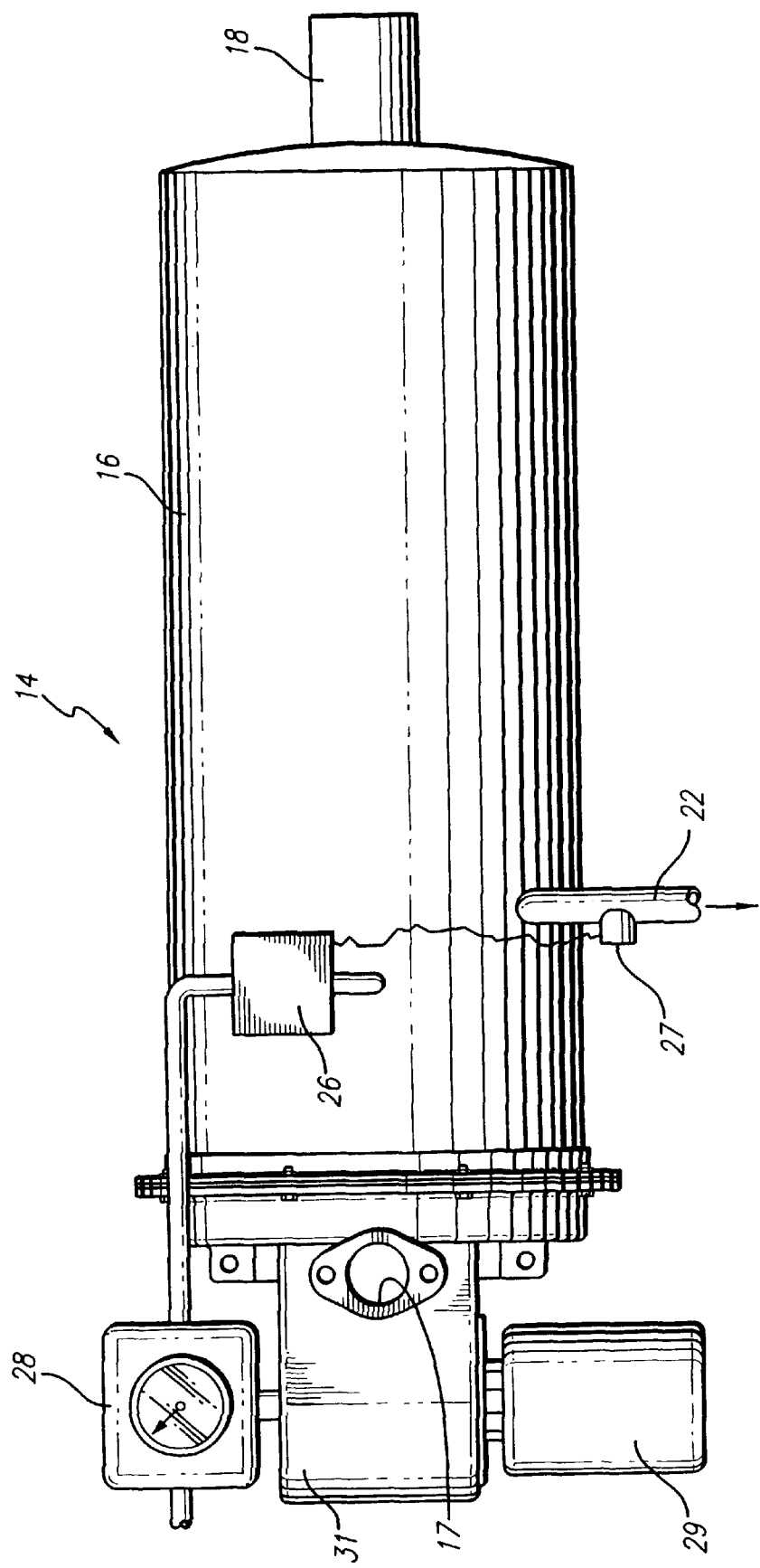

FUEL INJECTED HEAT EXCHANGER FOR INTERNAL COMBUSTION ENGINE EXHAUST

TECHNICAL FIELD

This invention is concerned with heating a liquid for pressure washing and surface cleaning. Specifically, the invention improves the performance of a heat exchanger which extracts heat from the exhaust gasses of an internal combustion engine to heat the cleaning liquid.

BACKGROUND ART

Objects have been washed of undesirable coatings and debris by directing a high pressure stream of heated liquid against the surface of the object.

Surface cleaning systems in use today spray a heated cleaning liquid onto the surface to be cleaned and the spent liquid and debris is vacuumed away from the surface. U.S. Pat. No. 4,940,082 granted Jul. 10, 1990 to James R. Roden for "Cleaning System" discloses a system in which exhaust gases from an internal combustion engine are passed through a heat exchanger to heat the cleaning liquid. The engine, of course, drives a pump to pressurize the cleaning liquid and a blower to create the vacuum.

U.S. Pat. No. 5,033,264 granted Jul. 23, 1991 to Richard E. Cabral for "Compact Cogeneration System" discloses the idea of placing a catalytic converter inside the exhaust gas heat exchanger and utilizing the heat given off by the converter to further heat the cleaning liquid.

The combination of the Roden system with the Cabral heat exchanger is capable of heating the cleaning liquid to temperatures which are adequate for cleaning fabrics and carpets; 180° F. to 200° F. However, for more difficult cleaning tasks, say removing oil, grease and grime from a concrete surface, it is highly desirable to heat the cleaning liquid to higher temperatures. This is particularly true when cleaning the surface with an appliance like that disclosed in U.S. Pat. No. 5,711,051 granted Jan. 27, 1998 to Michael J. Roden for "Hard Surface Cleaning Appliance". That apparatus relies on the force of the cleaning liquid sprayed onto the surface to loosen the debris.

SUMMARY OF THE INVENTION

This invention contemplates injecting fuel oil into the heat exchanger downstream of the catalytic converter to provide additional heat for heating the cleaning liquid passing through the exchanger. A blower is also provided for injecting ambient air into the heat exchanger to support combustion of the fuel.

BRIEF DESCRIPTION OF THE DRAWINGS

The invention is described in greater detail hereinafter by reference to the accompanying drawings wherein:

FIG. 3 is a plan view of the heat exchanger; and

BEST MODE FOR CARRYING OUT THE INVENTION

Figure 1:
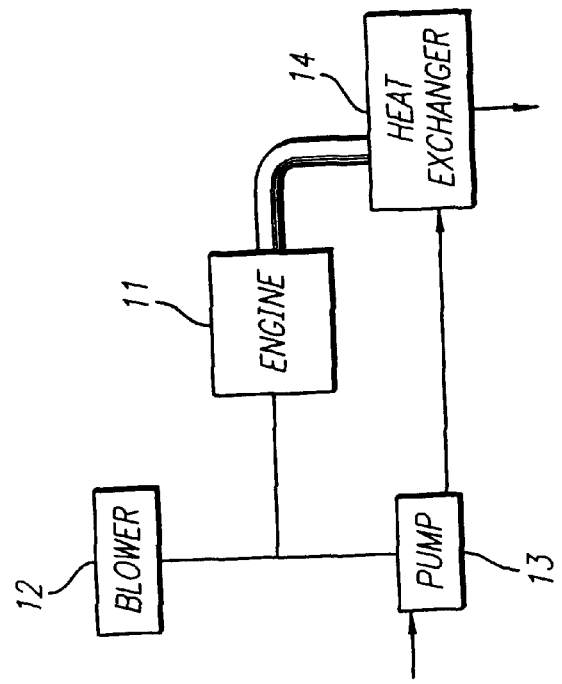
FIG. 1 is a schematic illustration of an internal combustion engine and exhaust gas heat exchanger combination which can utilize the invention.

Referring to FIG. 1, schematically depicted there are an internal combustion engine 11 driving a blower 12 and a pump 13 with the exhaust from the engine directed into a heat exchanger 14. Pump 13 propels cleaning liquid through the heat exchanger 14 to a cleaning appliance (not shown).

Figure 2:
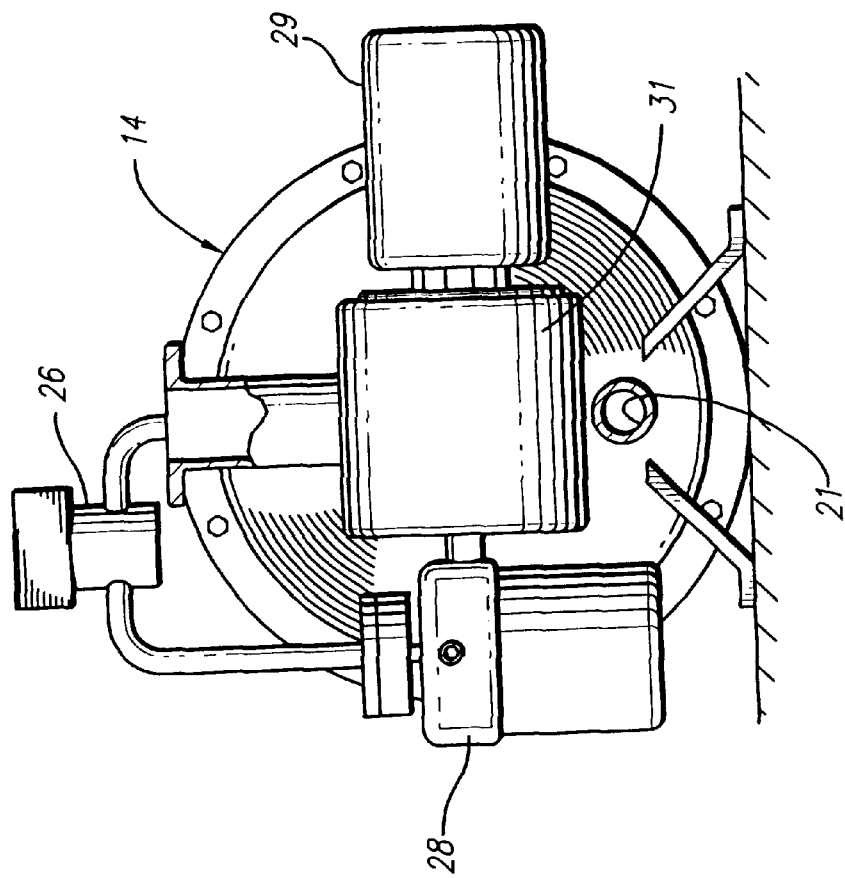
FIG. 2 is an end view of a heat exchanger embodying the invention.
Figure 4:
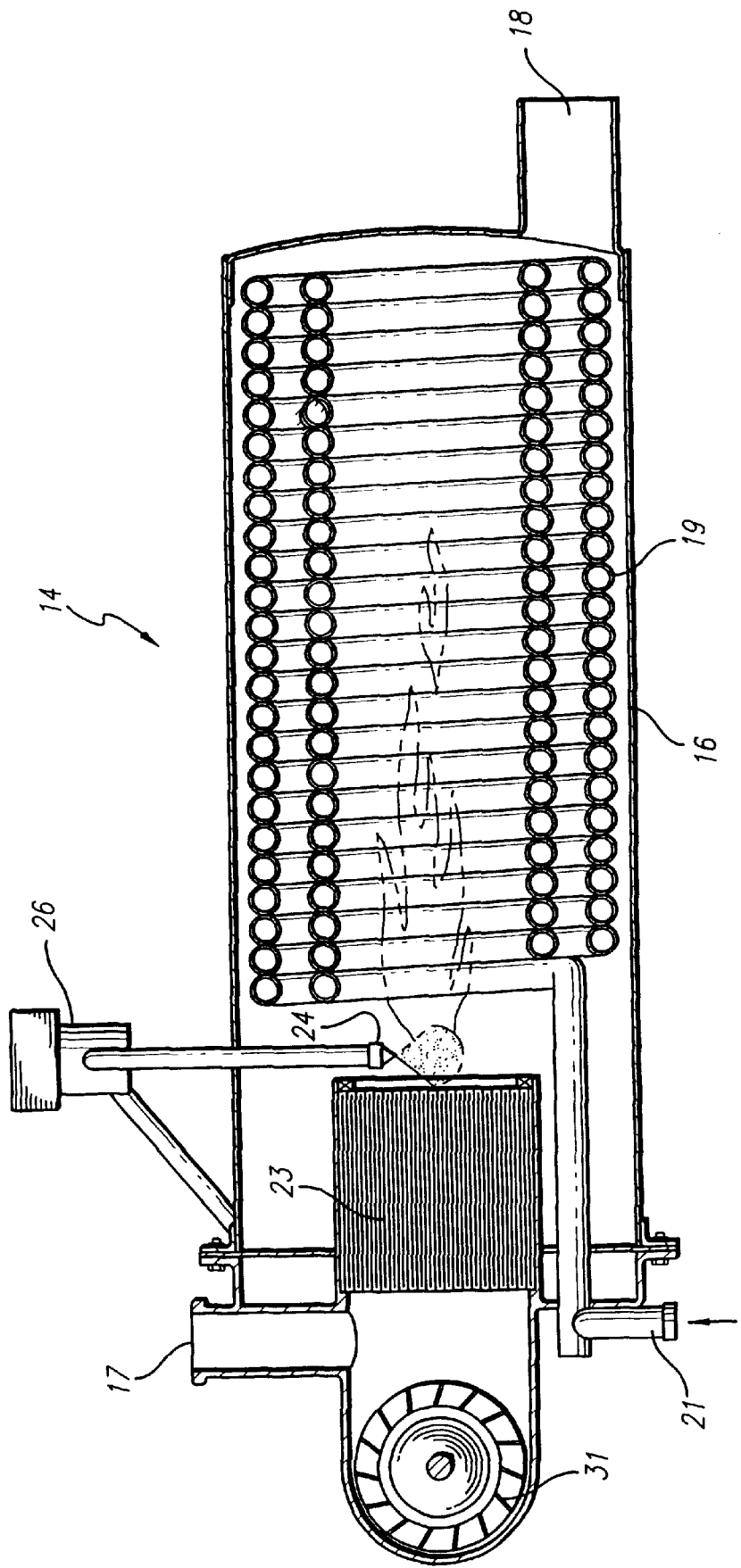
FIG. 4 is a vertical sectional view through the heat exchanger.

Heat exchanger 14 is depicted in FIGS. 2 to 4. The heat exchanger comprises a generally cylindrical casing 16 having an exhaust gas inlet 17 and an exhaust gas outlet 18. Disposed within the casing 16 are cleaning liquid coils 19 having an inlet 21 and an outlet 22.

Also located within the exchanger casing 16 downstream of the gas inlet 17 is a catalytic converter 23 through which exhaust gasses from the engine 11 are caused to flow. It is the nature of the catalytic converter 23 to react with the exhaust gasses to substantially cleanse the gasses and, incidentally, to give off significant quantities of heat. The thus heated exhaust gasses, which can reach temperatures of 1200° F., apply that heat to cleaning liquid flowing in coils 19.

In accordance with this invention fuel is injected into the heat exchanger casing 16 downstream of the catalytic converter 23 by means of a nozzle 24. The fuel is ignited by the hot exhaust gasses exiting the catalytic converter 23 adding further heat to the gas stream for heating coils 19 and the liquid flowing therethrough.

Fuel flow to the nozzle 24 is controlled by a solenoid valve 26 connected to a temperature sensing unit 27 on the outlet 22 of the coils 19. Pressurized fuel is supplied by a pump 28 driven by a motor 29 which also drives a centrifugal blower 31.

Blower 31 draws ambient air into the heat exchanger 14 and mixes with the stream of engine exhaust gasses to support combustion of the fuel injected from fuel nozzle 24.

From the foregoing it should be apparent that the heat exchanger of this invention is capable of imparting significant quantities of heat to a cleaning liquid.

What is claimed is:

1. In a heat exchanger for extracting heat from the exhaust gasses of an internal engine to heat a cleaning liquid, an exhaust gas inlet and an exhaust gas outlet for the heat exchanger, a catalytic converter in the exchanger downstream of the gas inlet, and a nozzle for injecting fuel into the exchanger downstream of the catalytic converter, the temperature of the gasses exiting the catalytic converter being sufficient to ignite the fuel.

2. The heat exchanger of claim 1 further comprising a blower for injecting ambient air into the heat exchanger for supporting combustion of the fuel.

\* \* \* \* \*